United States Patent [19]

Cervinka

[11] 4,272,110
[45] Jun. 9, 1981

[54] VIBRATORY SANDER

[76] Inventor: Franz Cervinka, Oberleitenweg Nr. 35, A-6370 Kitzbühel, Austria

[21] Appl. No.: 919,545

[22] Filed: Jun. 27, 1978

[30] Foreign Application Priority Data

Jun. 28, 1977 [AT] Austria ................................. 4602/77

[51] Int. Cl.³ ........................ B60B 39/06; B60B 39/10; B61C 15/10
[52] U.S. Cl. ........................................ 291/23; 291/25; 291/28; 291/38
[58] Field of Search .................... 291/1, 23, 25, 28, 33, 291/34, 38, 39

[56] References Cited

U.S. PATENT DOCUMENTS

| 2,182,969 | 12/1939 | Madigan ................................ 291/34 |
| 2,550,608 | 4/1951 | Shotwell ............................ 291/38 X |
| 3,345,098 | 10/1967 | Kilgore et al. ..................... 291/28 X |
| 3,588,155 | 6/1971 | Hirt ......................................... 291/1 |
| 3,827,736 | 8/1974 | Mango ................................ 291/28 X |

FOREIGN PATENT DOCUMENTS

| PA602494 | 8/1964 | Fed. Rep. of Germany ............. 291/33 |
| 1904893 | 11/1964 | Fed. Rep. of Germany ............. 291/33 |
| 2400378 | 7/1975 | Fed. Rep. of Germany ............. 291/39 |
| 1381038 | 10/1964 | France ........................................ 291/38 |

Primary Examiner—Howard Beltran
Attorney, Agent, or Firm—McGlew and Tuttle

[57] ABSTRACT

A sanding device for motor vehicles comprising at least one refillable sand reservoir having a funnel-shaped bottom, its discharge being disposed above a vibrating channel, said channel being set into vibrations by electric energy and conveying the sand to a dredger belonging to the wheel of the motor vehicle, the end of the vibrating channel directed towards the wheel being arranged to be locked by a flap, and the bottom of said vibrating channel being substantially plane.

10 Claims, 5 Drawing Figures

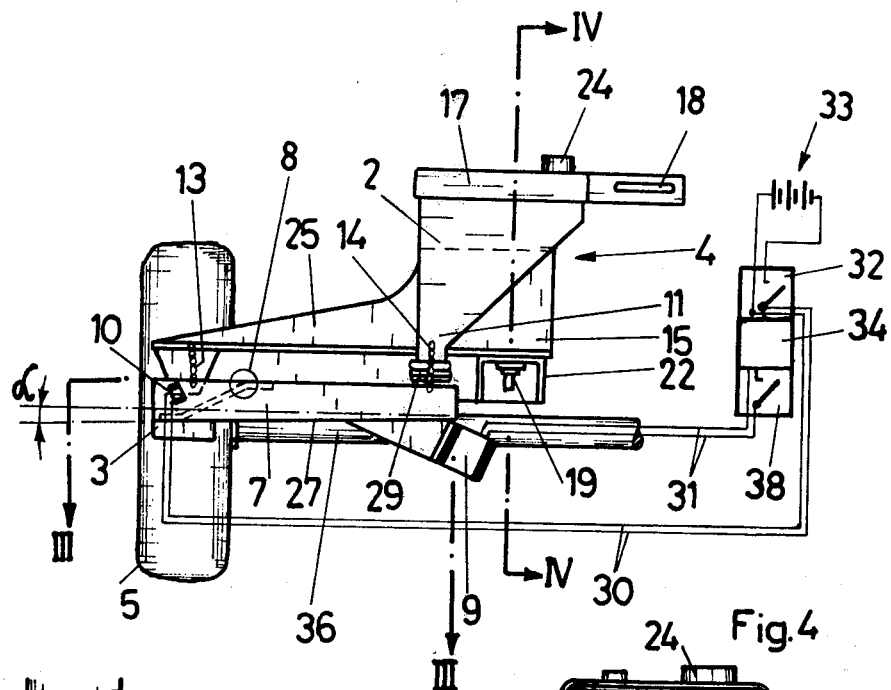
Fig. 2
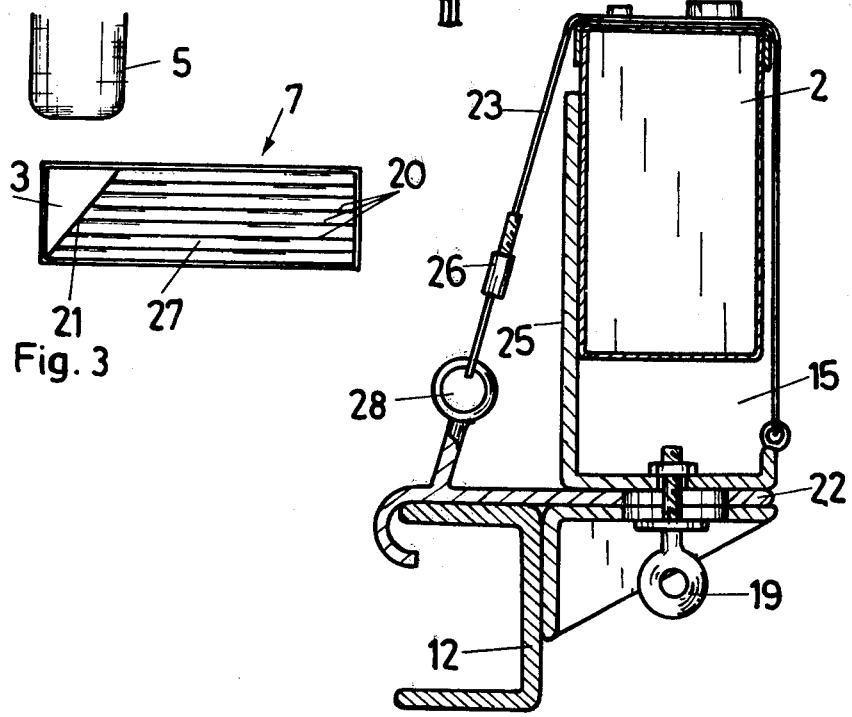
Fig. 3
Fig. 4

VIBRATORY SANDER

BACKGROUND OF THE INVENTION

1. Field of the Invention

The invention relates to a sanding device for motor vehicles comprising at least one refillable sand reservoir having a funnel-shaped bottom, its discharge being disposed above a vibrating channel, said channel being set into vibrations by electric energy and conveying the sand to a dredger belonging to the wheel of the motor vehicle, the end of the vibrating channel directed towards the wheel being arranged to be locked by a flap.

2. Description of the Prior Art

In a known sanding device, a heatable sand reservoir is provided with a precipitous channel which is set into vibrations by electrically moved vibrators, thus, forming a vibrating channel whose discharge can be locked by a sliding flap.

When closed, a sand column rests on the sliding flap, thus, making it at least more difficult to open the flap. As the heating is provided in the sand reservoir, the sand lying on the sliding flap will cool off and easily freeze in the flap portion so that the sliding flap cannot be opened any more.

A further sanding device whose vibrating channel is moved by an electromagnet is also known. As no flap for locking the free end of the vibrating channel is provided, the channel ascends by a relatively big angle towards the free end. During long periods of non-use, however, the sand will consequently move backwards in the channel due to the vibrations of the vehicle and, if required (suddenly occurring glazed frost or the like) no sand will be in the free end of the channel. As road conditions may all at once change during this season, this is absolutely required and only immediate sanding can prevent the skidding of the vehicle or maintain its steerability.

SUMMARY OF THE INVENTION

It is the object of the present invention to provide a sanding device whose vibrating channel contains at least in its end portion a layer of sand which can at any time and immediately be dispersed over the tire width of the wheel and which will neither be moved backwards by the vibrations of the vehicle nor discharged at the wrong time.

According to the invention this is achieved by providing a substantially plane bottom of the vibrating channel. Substantially plane means that is at the most slightly inclined with respect to the horizontal line so that, out of operation, the sand remains in its position spread over the entire surface of the bottom of the vibrating channel independently of the vibrations of the vehicle. When opening the flap and starting vibrations, the sand is immediately discharged to the road in front of the wheel.

If the flap is locked by a releasable device in its closed position the angle can be bigger but must not be so big that clogging of the sand is caused in the end portion of the vibrating channel by the vibrations of the vehicle and can, thus, not be discharged any longer. The maximum angle will include a few degrees.

Regular sanding corresponding to the running surface of the tire can be achieved by providing longitudinally extending grooves in the bottom of the vibrating channel, as is known, as well as a diagonal end portion of the bottom on the side of the wheel if the vibrating channel extends transversally to the moving direction, i.e. the axle of the wheels. By providing a diagonal end on the bottom of the channel, a longer sanding edge is obtained so that this embodiment makes it possible to dispose the sanding device according to the invention, removably on the bumper of the motor vehicle, for example, and to obtain at the same time the desired spreading width corresponding to the running surface of the tires.

The sanding device according to the invention can also be disposed in the interior of the vehicle, e.g. in the boot or underneath the engine hood, parallel or normally to the moving direction, in fixed or removable manner.

The embodiment according to the invention guarantees in any case that the end portion of the bottom of the vibrating channel directed towards the wheel is covered by loosely lying sand which can, if requested, be immediately discharged to the road and which is, on the other hand, neither moved backwards by the vibrations of the vehicle nor discharged at the wrong time.

BRIEF DESCRIPTION OF THE DRAWING

In the following the embodiments of the invention will be described in more detail by means of the FIGURES of the attached drawing without being limited thereto.

FIG. 2 shows a front view of a sanding device for one wheel, FIG. 3 shows a sectional view of the vibrating channel along line III of FIG. 2, and FIG. 4 shows a sectional view of the sand reservoir including the fastening means along line IV—IV of FIG. 2.

DESCRIPTION OF THE PREFERRED EMBODIMENTS

Figure 1:
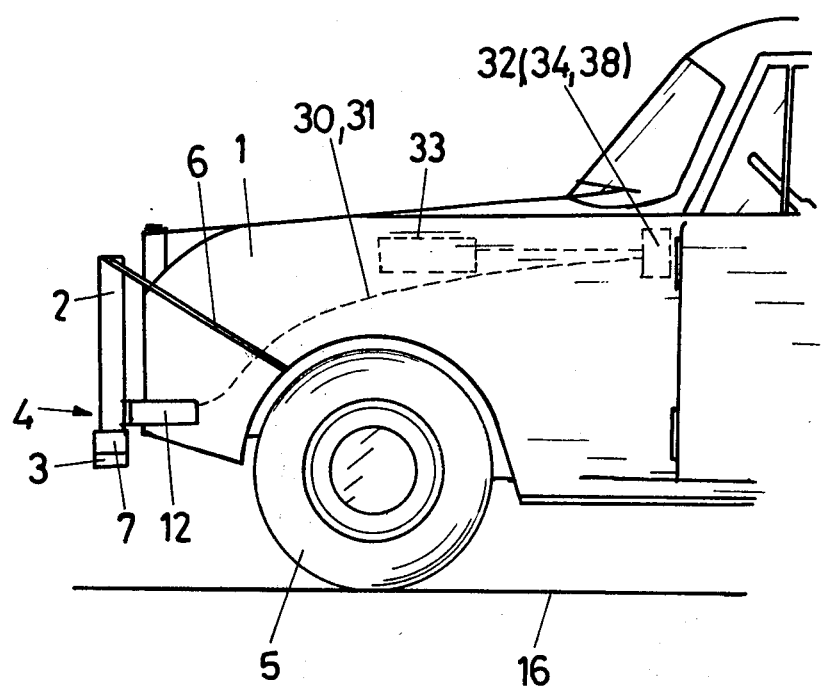
FIG. 1 shows a partial view of a passenger car with a sanding device for the front wheels being mounted on the front bumpers.
Figure 5:
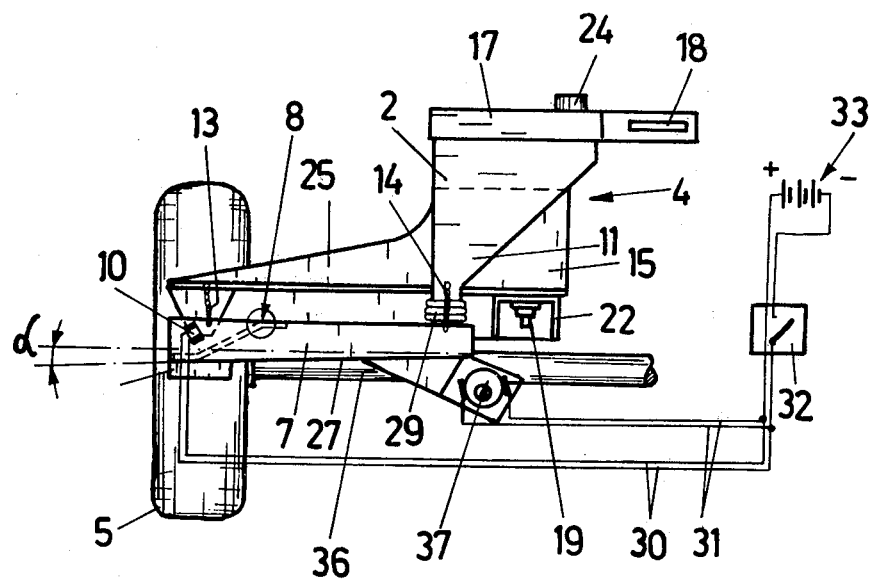
FIG. 5 shows a front view of an alternate embodiment of a sanding device for one wheel.

A sanding device 4 according to the invention is removably disposed at the front bumper 12 of a schematically illustrated motor vehicle 1, said device comprising a sand reservoir 2, a discharge nozzle 3 and an electromagnetically moved vibrating trough or channel 7. The sand reservoir 2 is in its upper portion fastened to the fender of the vehicle by means of a strap 6. By means of the discharge nozzle 3 sand can be discharged to the road 16 in front of the front wheel 5.

As illustrated in FIG. 2, the bottom 27 of the vibrating channel 7 is downwardly inclined in the direction of its end adjacent the wheel at a small angle, e.g. 5° relative of a horizontal plane. The end, in the off-position, is closed by a flap 8 pivotable round an axle extending parallel to the bottom 27. The pivoting axle of the flap 8 extends, according to the embodiment, above the bottom 27 so that the flap rests by its own weight, on the end of the bottom 27 directed towards the wheel.

It would, for example, also be possible to dispose the flap 8 pivotally in the downward direction in the extension of bottom 27, there being locked when out of operation.

An electromagnet 9 belongs to the end of the vibrating channel 7 directed towards the sand reservoir 2, said electromagnet setting the vibration channel 7 into vibrations, said channel being suspended on a holding device 15 by means of chains, straps or the like 13, 14. In accordance with well known practices, the electromagnet 9 may be energized by a power source 33 connected to the electromagnet by the electrical line 30 and a control device 34 having a switch 32. The holding device 15 also takes up the sand reservoir 2 and is, for example, fastened to the bumper 12. When switching on the vibrating apparatus, the flap 8 can simultaneously be opened and unlocked by means of a further electromagnet 10 connected to power source 33 by electrical lines 30 and switch 38 so that the open end 21 directed towards the wheel of the vibrating channel 7 is set free as soon as sand is conveyed. By arranging inclination of the bottom 27 of the vibrating channel 7 at an angle $\alpha$ between zero and five degrees, relative to the horizontal plane, the sand remains spread over the whole surface of the bottom 27, the loose arrangement of the sand not being disturbed by the vibrations of the motor vehicle and the sand being ready for discharge at any time.

In the illustrated arrangement of flap 8, the electromagnet 10 can be omitted, as flap 8 is lifted by the moving sand and locks the free end 21 again, when the vibrating apparatus is switched off.

In the sectional view along line III—III of FIG. 2, as illustrated in FIG. 3, the bottom 27 of the channel 7 is provided with longitudinally extending grooves 20 communicating with the open end 21 which guarantee that the sand is spread over the whole surface and also discharged along the open end 21 of the channel 7.

With sanding devices which are, as illustrated, disposed transversally to the moving direction the open end 21 according to FIG. 3 can, for example, be diagonally cut at an angle of about 45°, thereby forming a triangular cross section and thus obtaining the desired spreading width, i.e. approximately $\frac{2}{3}$ of the tire width of the wheel 5.

FIG. 4 shows an embodiment in which the sanding device according to the invention is removably disposed on a bumper 12 of a motor vehicle. A supporting bracket 22 is hooked on the bumper 12, said bracket being linked to the holding device 15 for the sand reservoir 2 by means of at least one screw 19. The holding device 15 has a U-shaped cross-section and, on the side directed towards the vehicle, a vertical flange 25 extended in the upward direction, its lateral extension also being provided as suspension of the vibrating channel 7. By means of at least one strap 23 which can be elastic or provided with a turnbuckle 26, the sand reservoir 2 is fastened to the holding device 15. Said strap extends from the front vertical flange of the holding device 15 over the sand reservoir 2 and down again along its back and is hooked in an eye 28 of the supporting bracket 22. As already shown in FIG. 1, a lateral strap 6 can additionally be directed to the fender. On its upper side the sand reservoir 2 has a lockable charge opening 24. For sanding both front or rear wheels of a vehicle two sanding devices 4 according to the invention are symmetrically disposed on a bumper 12, whereby, as indicated in FIG. 2, a frame 17 can be fastened to each sand reservoir 2 having an extension being provided with a slot 18. The two sand reservoirs 2 can be connected by means of a screw, not being illustrated, which is inserted into two slots 18 of two frames 17, whereby different wheel gauges of the vehicles can be adjusted by means of the slots 18.

In order to protect the sand against water jets, the discharge 11 of the sand reservoir 2 and the vibrating channel 7 being covered in this embodiment can additionally be sealed by a rubber collar 29. If the discharge nozzle 3 is additionally provided with a heating device the danger of frozen sand can be prevented in this area.

The material used for the vibrating channel 7 and the sand reservoir 2 can be sheet metal or plastics. Particularly good sanding results have been achieved with sand having broken, rough grain and a grain size in the range of between 1 to 5 mm, the sand preferably being dust-free and fire-dried. A sand reservoir according to the embodiment, its dimensions being 30×27.5×15 cm can take up 11.7 kg of sand. This amount will be sufficient for several sanding processes, particularly in the case of suddenly occurring glazed frost, as starting aid etc. The power required for the electromagnet is about 50 W and can be taken from the car battery.

As already mentioned, an unbalance motor 37 can also be used for operating the vibrating channel 7. In accordance with well known practices, the unbalance motor 37 can be energized by a power source 33 via electrical lines 31. In each case, for operating the electromagnets or unbalance motor, the sanding device can be operated by a switch 32 from the driver-seat.

If the sanding device is removably disposed, the electric energy for the electromagnet, the unbalance motor and the heating can be supplied by a socket fixed to the vehicle and by a connecting cable with a plug.

What is claimed is:

1. A sanding device for wheeled motor vehicles comprising, a source of electric power, a vibratable channel having a bottom, at least one refillable sand reservoir having a funnel-shaped bottom with a discharge opening being disposed above said vibrating channel, means for vibrating said channel operatively connected to said source of electric power and conveying the sand to a channel opening in said bottom in alignment with and in front of the wheel of the motor vehicle, said channel opening being disposed at an end of said channel directed towards the wheel, a flap arranged to close said channel opening to control the flow of the same therethrough, and said bottom being substantially planar disposed at a slightly upwardly inclined angle relative to a horizontal plane and having grooves longitudinally communicating with said channel opening, and said channel being transversely disposed with respect to the direction of movement of the vehicle and the end of said bottom on the side of the wheel having a diagonal side so that said channel opening has a triangular cross-sectional area dimensioned to pass sand in a predetermined spreading width.

2. A sanding device for selectively discharging sand in front of a wheeled motor vehicle comprising:

a source of electric power, a reservoir container for storing and delivering sand, said reservoir container being formed with a vertically disposed funnel-shaped bottom member having a triangularly shaped delivery opening for delivering the sand and with a top having an inlet opening for receiving the sand, a trough underlying said delivery opening having a substantially plane bottom member to provide sand over the entire surface of said bottom member and said bottom member having a discharge opening dimensioned for discharging a predetermined width of sand in front of the wheel, electric means operatively connected to said source of electric power for vibrating said trough thereby conveying sand along said bottom member from said reservoir container to said discharge opening, a flap member pivotally disposed within said trough for controlling the flow of the sand therethrough said discharge opening, said substantially plane bottom of said trough includes a plurality of longitudinally extending grooves communicating with said discharge opening.

3. A sanding device according to claim 2, wherein said trough is transversely disposed relative to the direction of movement of said vehicle, and said discharge opening being formed with a triangular cross-section.

4. A sanding device according to claim 2, wherein said electric means includes an electromagnet.

5. A sanding device according to claim 2, wherein said electric means includes an unbalance motor.

6. A sanding device according to claim 2, wherein said substantially plane bottom is inclined toward said discharge opening and the wheel at a slightly upwardly inclined angle relative to a horizontal plane.

7. A sanding device according to claim 6, wherein said discharge opening is formed with a triangular cross-section.

8. A sanding device according to claim 7, wherein said electric means includes an electromagnet.

9. A sanding device according to claim 8, wherein said flap is pivotally disposed to rest in a position to close said discharge opening under the force of the weight of said flap.

10. A sanding device according to claim 9, further comprising electromagnet means operatively connected to said source of electric power for actuating said flap to selectively open and close said discharge opening.

* * * * *